(12) United States Patent
Sugimura et al.

(10) Patent No.: US 8,513,526 B2
(45) Date of Patent: Aug. 20, 2013

(54) WIRING HARNESS

(75) Inventors: Keigo Sugimura, Shizuoka (JP);
Takeshi Kamata, Shizuoka (JP); Kenji Kinezuka, Shizuoka (JP)

(73) Assignee: Yazaki Corporation, Tokyo (JP)

(*) Notice: Subject to any disclaimer, the term of this patent is extended or adjusted under 35 U.S.C. 154(b) by 263 days.

(21) Appl. No.: 12/736,407

(22) PCT Filed: Dec. 22, 2008

(86) PCT No.: PCT/JP2008/073304
§ 371 (c)(1),
(2), (4) Date: Oct. 6, 2010

(87) PCT Pub. No.: WO2009/125524
PCT Pub. Date: Oct. 15, 2009

(65) Prior Publication Data
US 2011/0024157 A1    Feb. 3, 2011

(30) Foreign Application Priority Data
Apr. 10, 2008  (JP) .................................. 2008-102137

(51) Int. Cl.
*H01B 7/36* (2006.01)
(52) U.S. Cl.
USPC .......................................................... 174/112
(58) Field of Classification Search
USPC .......................................................... 174/112
See application file for complete search history.

(56) References Cited

U.S. PATENT DOCUMENTS

| 4,781,619 A | * | 11/1988 | Ikeda .............................. 439/488 |
| 6,672,895 B2 | * | 1/2004 | Scheiner ........................ 439/491 |
| 8,148,639 B2 | * | 4/2012 | Auphand et al. .......... 174/110 R |
| 2006/0118325 A1 | | 6/2006 | Yagi et al. |
| 2006/0225909 A1 | * | 10/2006 | Kurimoto et al. ............... 174/36 |

FOREIGN PATENT DOCUMENTS

| CN | 1682321 A | 10/2005 |
| EP | 1548753 A1 | 6/2005 |
| FR | 2887069 A1 | 12/2006 |
| JP | 58-53314 | 4/1983 |
| JP | 11-027817 A | 1/1999 |

(Continued)

OTHER PUBLICATIONS

Office Action dated Jul. 28, 2011, issued for the Chinese patent application No. 200880129473.4.

(Continued)

*Primary Examiner* — Chau Nguyen
(74) *Attorney, Agent, or Firm* — Edwards Wildman Palmer LLP

(57) ABSTRACT

A wiring harness 1 includes: an electric wire 2; and a connector 3. The electric wire 2 includes: a conductive core wire 21; and an insulating cover 22 for covering the core wire 21. The connector 3 is attached to an end 2a of the electric wire 2, and receives the end 2a of the electric wire 2. A first marker 6 and a second marker 7 are formed on an outer surface 22a of the cover 22 of the electric wire 2. The first marker 6 is formed by coloring a part of the outer surface 22a of the cover 22 of the electric wire 2 received in the connector 3 in a color A. The second marker 7 is formed by coloring a part of the outer surface 22a of the cover 22 of the electric wire 2 exposed to an outside of the connector 3.

4 Claims, 3 Drawing Sheets

(56) References Cited

FOREIGN PATENT DOCUMENTS

| JP | 2003-229225 A | 8/2003 |
| JP | 2005-347101 A | 12/2005 |
| JP | 2008-269892 A | 11/2008 |
| WO | WO-2004/015720 A1 | 2/2004 |
| WO | WO-2006/134251 A1 | 12/2006 |

OTHER PUBLICATIONS

International Search Report dated Mar. 24, 2009, issued for PCT/JP2008/073304.
Extended European Search Report dated Dec. 21, 2012 issued in Application No. 08873806.7.

* cited by examiner

WIRING HARNESS

TECHNICAL FIELD

This invention relates to a wiring harness including: an electric wire having a conductive core wire and an insulating cover for covering the core wire; and a connector for receiving an end of the connector therein.

BACKGROUND ART

Various electronic devices are mounted on a vehicle or the like as a moving body. Therefore, a wiring harness (for example, see Patent Document 1) is routed in the vehicle or the like for transmitting an electric power from a battery, or a control signal from a computer to the electronic device. The wiring harness described in the Patent Document 1 at least includes: a plurality of electric wires; and a connector attached to ends of the electric wire and receiving the ends of the electric wire.

The electric wire is a so-called covered wire. The electric wire includes: a conductive core wire; and an insulating cover for covering the core wire. It is necessary for the electric wire to distinguish a size of the core wire, a quality of material (presence or absence of heat resistance or the like) of the cover, or a purpose of use. The purpose of use is, for example, a control signal for air-bag, ABS (Antilock Blake System) or the like, or a system of a vehicle in which an electric wire for transmitting an electric power or the like is used. Therefore, a marker is formed on an outer surface of the electric wire, namely, an outer surface of the cover for distinguishing the purpose of use or the like. A part of the outer surface of the cover as the marker is colored different from a color of the outer surface of the cover. A plurality of markers is formed on the outer surface of the cover arranged outside of the connector.

The connector includes: a terminal; and a connector housing for receiving the terminal. The terminal is made of conductive metal plate, and attached to a core wire exposed at an end of the electric wire to be electrically connected to the core wire. The connector housing is made of an insulating synthetic resin, and formed in a box shape. In the wiring harness, when the connector housing is connected to the electronic device or the like, the electric wire is electrically connected to the electronic device or the like via the terminal, and transmits the electric power or the control signal to the electronic device or the like.

When assembling the wiring harness, firstly, a long electric wire having no marker is cut in a specific length, and a marker is formed on the electric wire. Then, a cover at one end of the electric wire is removed, and a terminal is attached to an exposed core wire. The electric wires are connected to each other if necessary. Then, the terminal is inserted into a connector housing.

Exterior trim part such as corrugate tube is attached to the electric wires of the wiring harness assembled in this way in a manner that at least a part of the marker is exposed, and then, the electric wires are bundled into one piece. Then, the wiring harness is wired in a desired shape on a wiring board, and routed in a vehicle.

Patent Document 1: International Publication No. 04/015720

DISCLOSURE OF THE INVENTION

Problem to be Solved by the Invention

However, the marker described in the Patent Document 1 may be removed due to an external factor, for example, the marker is grazed on the exterior trim parts such as corrugate tube, peripheral parts, or a vehicle body panel when a wiring work or a routing work is operated. Then, there is a problem that it becomes difficult to distinguish electric wires when the marker is removed. In particular, when the marker is only formed on a part interposed between a connector of the electric wire and a corrugate tube, there is a problem that the electric wire cannot be distinguished when the marker is removed.

An object of the present invention is to solve these problems. Namely, the object of the present invention is to provide a wiring harness of which electric wire is surely distinguishable by preventing a marker formed on an outer surface of a cover of the electric wire from at least partially being removed.

Means for Solving the Problem

For attaining the object, according to the invention described in claim 1, there is provided a wiring harness including: an electric wire having a conductive core wire and an insulating cover for covering the core wire; and a connector attached to an end of the electric wire for receiving the end of the electric wire therein, characterized in that the wiring harness further includes:

a first marker formed by coloring a part of an outer surface of the cover of the electric wire received in the connector in a color different from a color of the outer surface; and a second marker formed by coloring a part of the outer surface of the cover of the electric wire exposed to an outside of the connector in a color the same as the first marker.

According to the invention described in claim 2, there is provided the wiring harness characterized in that the first and second markers are formed over a whole periphery of the cover.

Effects of the Invention

According to the invention claimed in claim 1, the wiring harness includes: a first marker formed by coloring a part of an outer surface of the cover of the electric wire received in the connector in a color different from a color of the outer surface; and a second marker formed by coloring a part of the outer surface of the cover of the electric wire exposed to an outside of the connector in a color the same as the first marker. Therefore, the first marker is prevented from being removed due to an external factor. Normally, the electric wire is distinguished using the second marker, and when the second marker is removed due to the external factor, the electric wire is distinguished using the first marker. Accordingly, at least the first marker is prevented from being removed, thereby the electric wire can be surely distinguished at any time.

According to the invention claimed in claim 2, the first and second markers are formed over a whole periphery of the cover. Therefore, it is rare that these markers are completely removed. In particular, the second marker is prevented from being removed, thereby the electric wire can be surely distinguished.

Figure 1:
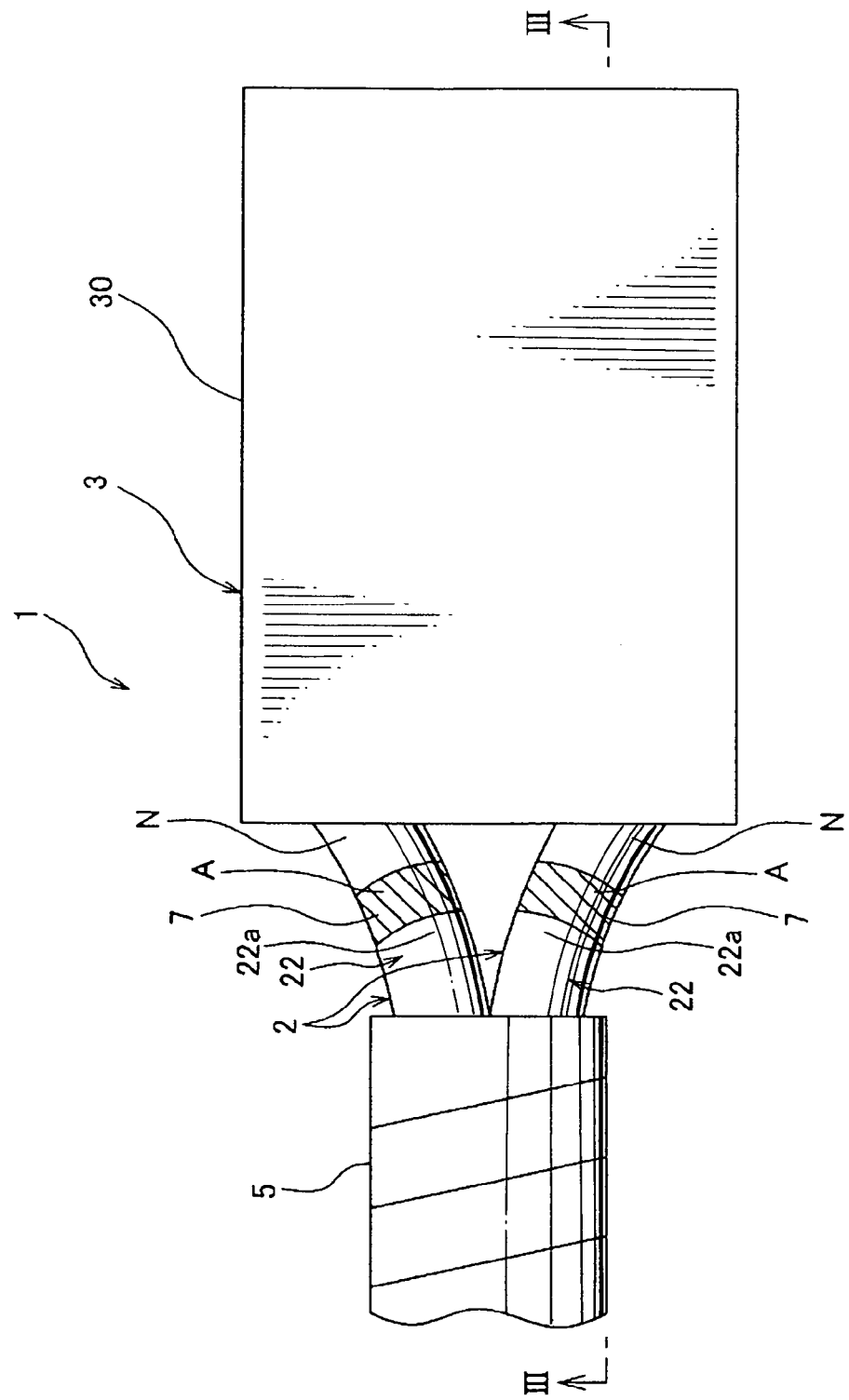
[FIG. 1] A top view showing a wiring harness according to an embodiment of the present invention.

REFERENCE SIGNS LIST 1 wiring harness
2 electric wire
2a end of the electric wire
3 connector
6 first marker
7 second marker
21 core wire
22 cover
22a outer surface of the cover
A color (first marker, second marker)
N mono color (outer surface of the cover)

DESCRIPTION OF EMBODIMENTS

Hereinafter, a wiring harness 1 according to an embodiment of the present invention will be explained with reference to FIGS. 1 to 3. The wiring harness 1 according to the embodiment of the present invention is, for example, routed in a vehicle as a moving body. As shown in FIG. 1, the wiring harness 1 includes: an electric wire 2; a connector 3; an exterior tape 5 as an exterior trim part; a first marker 6 (FIG. 3); and a second marker 7.

A plurality of electric wires (two in FIG. 1) is provided. The electric wire 2 is a so-called covered electric wire and a low-voltage electric wire, for example, used in a low voltage circuit in a vehicle. As shown in FIG. 3, the electric wire 2 includes: a conductive core wire 21; and an insulating cover 22. The core wire 21 is made of a plurality of elemental wires 21a being stranded. The elemental wire 21a composing the core wire 21 is made of conductive metal such as copper, aluminum, or the like. Further, the core wire 21 may be composed of a single elemental wire 21a.

The cover 22 is composed of a resin composition including: a base resin made of such as polyvinyl chloride resin, polypropylene resin, polyethylene resin, or the like; and various additive agents (stabilizing agent such as antioxidizing agent or light stabilizer, flame retardant, antistatic agent, bulking agent, coloring agent, or the like). The cover 22 covers an outer periphery of the core wire 21. Therefore, an outer surface 22a of the cover 22 is an outer surface of the electric wire 22. The cover 22 is partially removed at an end 2a (FIG. 3) of the electric wire 2, and the core wire 21 is exposed.

Figure 2:
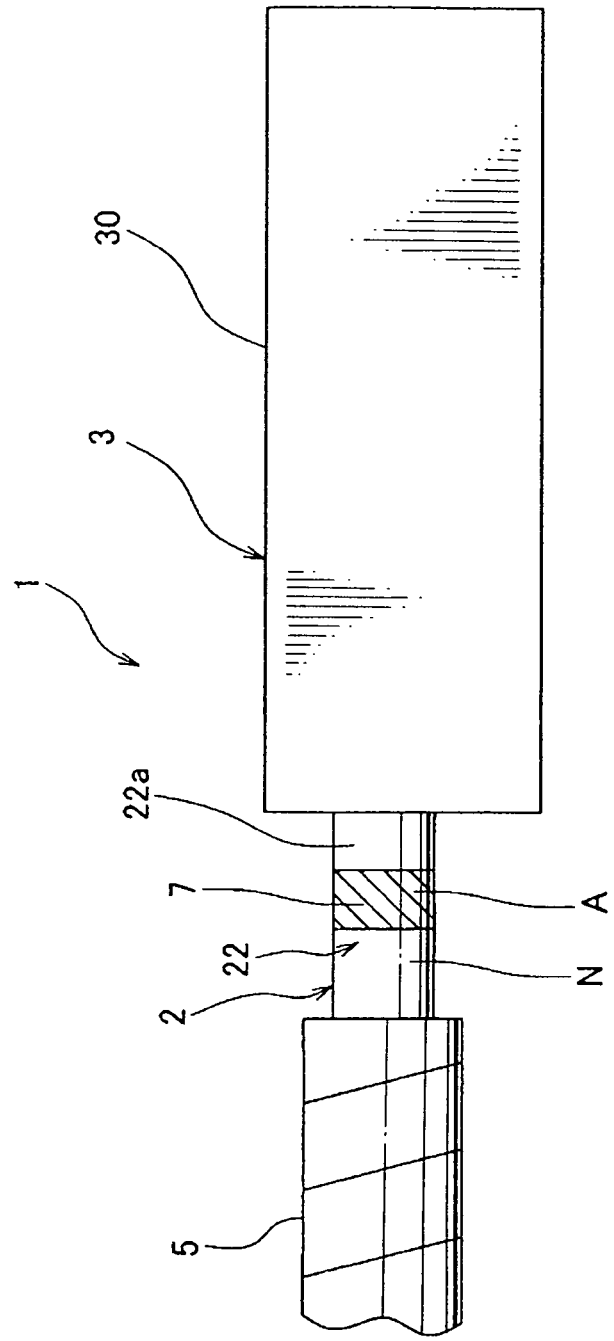
[FIG. 2] A side view showing the wiring harness shown in FIG. 1.
Figure 3:
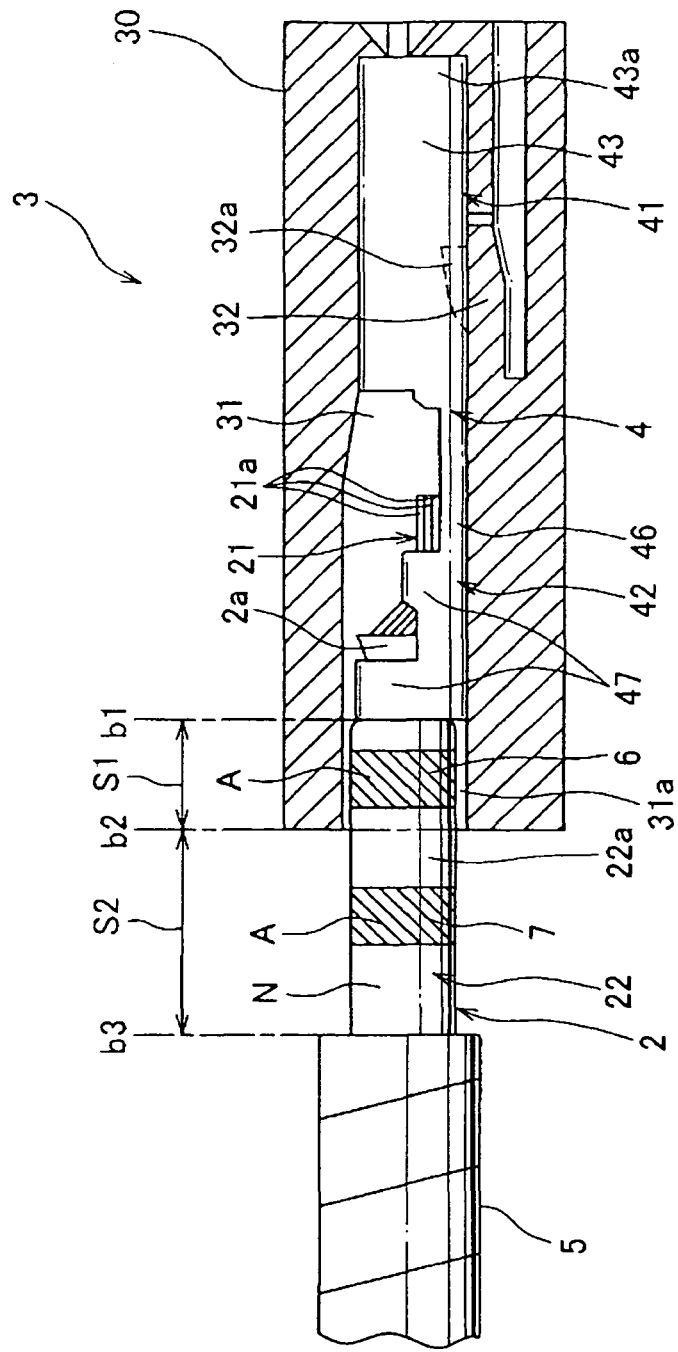
[FIG. 3] A sectional view taken on line III-III in FIG. 1.

The outer surface 22a of the cover 22 is colored in mono color N (indicated by white blank in FIGS. 1 to 3). A desired coloring material may be mixed with the resin component composing the cover 22 so as to make the color of the outer surface 22a of the cover 22 be the mono color N, or alternatively, the mono color N may be set as the color of the resin component itself without adding a coloring material to the resin material composing the cover 22. In the latter case that the mono color N is the color of the resin component itself, the outer surface 22a of the cover 22 is called color free. Thus, the color free means that the color of the outer surface 22a of the cover 22 is the color of the resin component itself without adding the coloring material to the resin component composing the cover 22.

As shown in FIG. 3, the connector 3 is attached to the end 2a of the electric wire 2, and receives the end 2a of the electric wire 2 therein. The connector 3 includes: a connector housing 30; and a terminal 40. The connector housing 30 is made of insulating synthetic resin, and formed in a tubular shape. A terminal receiving chamber 31 and a locking lance 32 are provided in the connector housing 30. The terminal receiving chamber 31 is a hole extending straight. A terminal 40 is inserted into the terminal receiving chamber 31 from one end 31a. The terminal receiving chamber 31 receives the terminal 40 and the one end 2a of the electric wire 2 to which the terminal 40 is attached.

The locking lance 32 is formed in an arm shape, and extended along a longitudinal direction of the terminal 40 received in the terminal receiving chamber 31. One end of the locking lance 32 near the one end 31a of the terminal receiving chamber 31 is continued to an outer wall of the connector housing 30, and the other end of the locking lance 32 away from the one end 31a is a free end. A locking projection 32a projected into an interior of the terminal receiving chamber 31 is formed on the free end. When the terminal 40 is inserted into the terminal receiving chamber 31 from the one end 31a, the locking projection 32a abuts on the terminal 40, and the locking lance 32 is elastically deformed in a direction outside of the connector housing 30. Further, when the terminal 40 is received in the terminal receiving chamber 31, the locking projection 32a is disposed in a later-described locking hole of the terminal 40, and the locking lance 32 is elastically restored. The locking lance 32 locks the terminal 40 in the terminal receiving chamber 31

The terminal 40 is made by folding a conductive metal plate or the like. The terminal 40 is a so-called female type terminal. The terminal 40 integrally includes: an electric contact part 41; and a wire connecting part 42. The electric contact part 41 includes: a tube part 43; a locking hole; and an elastic piece (not shown). The tube part 43 is formed in a rectangular tube shape. A terminal of a mating connector (hereinafter referred to as a mating terminal) is inserted into the tube part 43 from one end 43a away from the wire connecting part 42. The locking hole is formed by penetrating the tube part 43. The locking projection 32a of the locking lance 32 is inserted into the locking hole.

The elastic piece is provided in the tube part 43. The elastic piece is continued to an outer wall of the tube part 43 at the one end 43a side, and extended in a direction approaching the wire connecting part 42. The elastic piece is elastically deformable in a direction approaching the outer wall. The elastic piece push the mating terminal 40 inserted into the tube part 43 toward an inner wall of the tube part 43 to clip the mating terminal 40 between the inner wall and the elastic piece. When the elastic piece clips the mating terminal 40 between the inner wall and the elastic piece, the mating terminal 40 is held in the electric contact part 41, and the terminal 40 and the mating terminal 40 are electrically connected to each other.

The wire connecting part 42 includes: a bottom plate part 46; and a crimping piece 47. The bottom plate part 46 is formed in a substantially band shape, and the electric wire 2 is positioned on an outer surface of the bottom plate part 46. A plurality of crimping pieces 47 are provided at both ends of the bottom plate part 46 in a width direction. The crimping pieces are bent in a direction approaching the bottom plate part 46, and clip the electric wire 2 between the crimping piece and the bottom plate part 46 to crimp the electric wire 2. When the crimping pieces crimp the electric wire 2, the electric wire 2 is attached to the wire connecting part 42, and the terminal 40 and the electric wire 2 are electrically connected to each other.

The exterior tape 5 includes: a tape material made of such as polyvinyl chloride resin; and an adhesive material applied to one outer surface of the tape material. The exterior tape 5 is so wrapped around the electric wire 2 that the first and second markers 6, 7 are exposed. The exterior tape 5 bundles a plurality of electric wires 2 into one piece, and prevents the electric wire 2 from being damaged by contacting a vehicle panel or the like when the wiring harness 1 is routed in a vehicle.

As shown in FIG. 3, the first marker 6 is formed on the outer surface 22*a* of the cover 22 of the electric wire 2 received in the connector 3. The first marker 6 is formed on an area S (FIG. 3) between a border b1 between the cover 22 and the terminal 40, and a border b2 between the cover 22 and the connector 3. The first marker 6 is formed in a ring shape, and formed over a whole periphery of the cover 22. A length of the first marker 6 in a longitudinal direction of the cover 22 is shorter than a length of the area S1 in the longitudinal direction of the cover 22. Namely, a whole of the first marker 6 is received in the connector 3 (terminal receiving chamber 31). The first marker 6 is formed by coloring a part of the outer surface 22*a* of the cover 22 in a color A (indicated by parallel diagonal lines in FIG. 3) different from the color of the outer surface 22*a* (mono color N).

As shown in FIG. 3, the second marker 7 is formed on the 22*a* outer surface 22*a* of the cover 22 of the electric wire 2 exposed to an outside of the connector 3. The second marker 7 is formed on an area S2 (FIG. 3) between the border b2 between the cover 22 and the connector 3 and a border b3 between the cover 22 and the exterior tape 5. Namely, the second marker 7 is formed on a position which can be seen from an outside. A shape of the second marker 7 is the same as the first marker 6. The second marker 7 is formed in a ring shape, and formed over a whole periphery of the cover 22. A length of the second marker 7 in the longitudinal direction of the cover 22 is the same as the length of the first marker 6 in the longitudinal direction of the cover 22. The second marker 7 is formed by coloring a part of the 22*a* outer surface 22*a* of the cover 22 in a color (indicated by parallel diagonal lines in FIGS. 1 to 3) the same as the color A of the first marker 6. The first marker 6 and the second marker 7 are disposed with a gap in the longitudinal direction of the cover 22. Incidentally, only two markers of the first and second markers 6, 7 are formed at the one end 2*a* side of the electric wire 2. Further, in this embodiment, a length of the area S2 in the longitudinal direction of the cover 22 is not more than 10 mm.

By changing the color A of the first and second markers 6, 7 into various colors, the electric wires 2 can be distinguished from each other. For example, the inventors of the present invention use twelve colors including the color A. Due to the color A of the first and second markers 6, 7, a wire type of the electric wire 2 or a system of the wiring harness 1 can be distinguished. Namely, due to the color A of the first and second marker 6, 7, a purpose of use of the electric wire 2 of the wiring harness 1 can be distinguished. Therefore, when at least one of the first and second marker 6, 7 is provided, the purpose of use of the electric wire 2 of the wiring harness 1 can be distinguished.

Further, the first and second markers 6, 7 can be formed by spouting coloring material with a marking apparatus described in International Publication No. 04/015720. The coloring material means a liquid substance, in which a coloring substance (organic substance for use in industry) is dissolved and dispersed in a solvent. The coloring substance is a dye or a pigment (most of them being organic substances and synthetic substances). Sometimes, a dye is used as a pigment and a pigment is used as a dye. As a more concrete example, the coloring material is a coloring liquid or coating material.

The coloring liquid is a liquid, in which a dye is dissolved or dispersed in a solvent. The coating material is a material, in which a pigment is dispersed in a liquid dispersion. Therefore, when the coloring liquid adheres to the outer surface 22*a* of the cover 22, the dye permeates into the cover 22. When the coating material adheres to the outer surface 22*a* of the cover 22, the pigment adheres to the outer surface 22*a* without permeating into the cover 22. Preferably, the solvent and liquid dispersion have an affinity to the synthetic resin that constitutes the cover 22 in order to securely permeate the dye into the cover 22 or to allow the pigment to securely adhere to the outer surface 22*a*. As described above, to color the outer surface 22*a* of the cover 22 means to dye a part of the outer surface 22*a* of the cover 22 with a dye or to coat a part of the outer surface 22*a* of the cover 22 with a pigment.

When assembling the wiring harness 1 having the above-described structure, firstly, a long electric wire 2 having no marker is cut in a specific length. Then, the first and second marker 6, 7 are formed on the electric wire 2 with the well-known marking apparatus described above. At this time, because only the first and second markers 6, 7 are formed at the one end 2*a* side of the electric wire 2, the marking (coloring) operation can be simplified. Next, a part of the cover 22 at the one end 2*a* of the electric wire 2 is removed and the core wire 21 is exposed. Then, the terminal 40 is attached to the exposed core wire 21.

Then, the terminal 40 is inserted into the terminal receiving chamber 31 of the connector housing 30. At this time, the first marker 6 is disposed in the terminal receiving chamber 31, namely, in the connector 3. The second marker 7 is disposed outside of the terminal receiving chamber 31, namely, outside of the connector 3. Then, the exterior tape 5 is wrapped in a direction away from the connector 3 from a vicinity of the second marker 7 so that the second marker 7 is exposed. Thus, the wiring harness 1 is assembled. Then, the wiring harness 1 is wired in a desired shape on a wiring board, and then routed in a vehicle.

Normally, the second marker 7 is used for distinguishing the electric wire 2 of the wiring harness 1 assembled as described above. However, because the second marker 7 is exposed outside, the second marker 7 may be removed due to an external factor, for example, the marker is grazed on the exterior tape 5, peripheral parts, a vehicle body panel, or the like when a wiring work or a routing work is operated. In contrast, because the first marker 6 is arranged in the connector 3, the first marker 6 is not removed due to the external factor. Accordingly, when the second marker 7 is removed, the terminal 40 is pulled out from the terminal receiving chamber 31 using a jig or the like so that the first marker 6 is used for distinguishing the electric wire 2. Thus, the electric wire 2 can be distinguished at any time.

According to this embodiment, the wiring harness 1 includes: the first marker 6 formed by coloring a part of the outer surface 22*a* of the cover 22 of the electric wire 2 received in the connector 3 in a color A different from the mono color N of the outer surface 22*a*; and the second marker 7 formed by coloring a part of the outer surface 22*a* of the cover 22 of the electric wire 2 exposed to an outside of the connector 3 in the color A the same as the first marker 6. Therefore, the first marker 6 is prevented from being removed due to an external factor. Normally, the electric wire 2 is distinguished using the second marker 7, and when the second marker 7 is removed due to the external factor, the electric wire 2 is distinguished using the first marker 6. Accordingly, at least the first marker 7 is prevented from being removed, thereby the electric wire 2 can be surely distinguished at any time.

The first and second markers 6, 7 are formed over a whole periphery of the cover 22. Therefore, it is rare that these markers are completely removed. In particular, the second marker 7 is prevented from being removed, thereby the electric wire 2 can be surely distinguished.

According to this embodiment, the first and second markers 6, 7 are formed over a whole periphery of the cover 22. However, it is not necessary that the first and second markers 6, 7 are formed over a whole periphery of the cover 22. Further, according to this embodiment, the exterior tape 5 as the exterior trim part is attached to the electric wire 2. However, a corrugate tube (tube for harness), a protector for harness, a grommet for harness, a clip for wiring, or the like can be used as the exterior trim part.

Further, according to this embodiment, the wiring harness 1 for routing in a vehicle is described. However, the wiring harness 1 may be used for various electronic devices such as a portable computer, or for various electric machines. Further, according to this embodiment, two electric wires 2 are provided. However, the number of the electric wire 2 may be one or more than two. Further, according to this embodiment, the terminal 40 is a female type terminal. However, the terminal 40 may be a male type terminal. Further, according to the present invention, various materials may be used as the coloring liquid or coating material such as acrylic coating material, ink (dye or pigment) and UV-ink.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. A wiring harness comprising:
an electric wire having a conductive core wire;
an insulating cover for covering the core wire;
a connector attached to an end of the electric wire for receiving the end of the electric wire therein thereby forming a terminal,
only one first marker formed by coloring a part of an outer surface of the cover of the electric wire received in the connector in a color different from a color of the outer surface; and
only one second marker formed by coloring a part of the outer surface of the cover of the electric wire exposed to an outside of the terminal in a color the same as the first marker;
wherein the first and second markers remain exposed outside of the terminal;
wherein the second marker formed on an area between a border between inside and outside of the terminal, and a border between the insulating cover and an exterior tape; and
wherein the first marker and the second markers are formed on the outer surface of the cover such that when the terminal is inserted into a terminal receiving chamber the first marker is disposed completely in the terminal receiving chamber and the second marker is disposed completely outside the terminal receiving chamber.

2. The wiring harness as claimed in claim 1, characterized in that the first and second markers are formed over a whole periphery of the cover.

3. The wiring harness as claimed in claim 1, wherein the first marker formed on an area between a border between the cover and the terminal, and a border between the cover and the connector.

4. The wiring harness as claimed in claim 1, wherein
the color of the first and second markers is changed into various colors for different purpose of use to distinguish a wire type of the electric wire or a system of the wiring harness.

* * * * *